Jan. 16, 1945.   D. G. REMPEL   2,367,525
MOLD CONSTRUCTION FOR PLATEN PRESSES
Filed Aug. 13, 1943
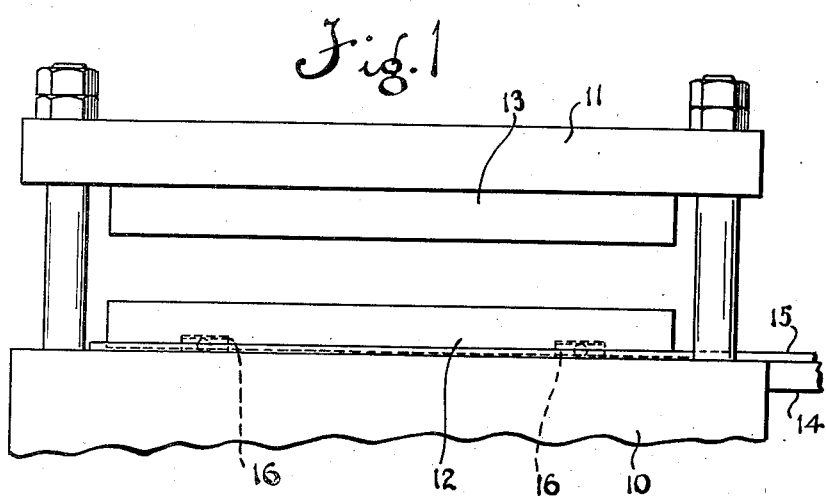
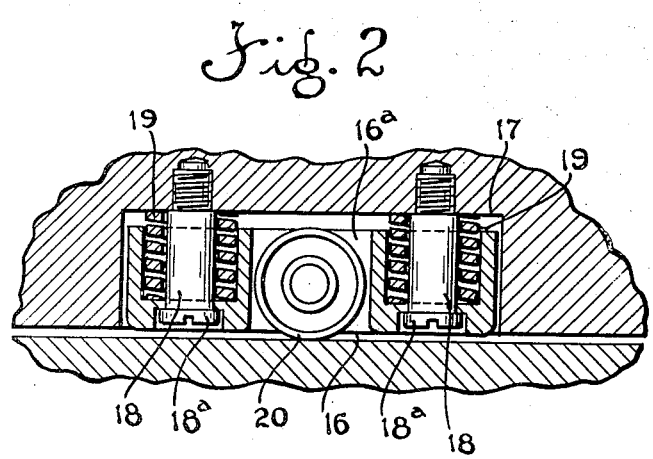
INVENTOR.
Dietrich G. Rempel
BY J Ralph Darrow Patented Jan. 16, 1945

2,367,525

UNITED STATES PATENT OFFICE 2,367,525

MOLD CONSTRUCTION FOR PLATEN PRESSES

Dietrich G. Rempel, Akron, Ohio, assignor to Sun Rubber Company, Barberton, Ohio, a corporation of Ohio Application August 13, 1943, Serial No. 498,450

3 Claims. (Cl. 18—16)

This invention relates to mold constructions for platen presses.

In the manufacture of molded articles of rubber and plastic materials in platen presses, it has heretofore been the practice to provide relatively movable platens with one mold section fixed to one platen, and another mold section adapted to be slid into and out of the mold to facilitate the supplying of moldable material to the mold and removal of the finished articles from the mold.

Heretofore, it has been suggested that the sliding mold section may be provided with one or more roller supports to eliminate the labor involved due to the friction between the sliding surfaces of the mold and the surfaces of the shelf or platform and of the mold platen upon which the mold section is slid into and out of the press. Such devices however, have not been satisfactory and have not been generally used.

The purpose of the present invention is to provide an improved means for supporting the sliding mold section to be moved into and out of a press and including one or more members carrying rollers arranged in one or more sockets in the bottom of the sliding mold section so as normally to support the mold section, but adapted to be yieldingly depressed upwardly in the sockets when the mold sections are brought together under pressure between the pressure platens.

The foregoing and other purposes of the invention are attained in the mold construction for platen presses illustrated in the accompanying drawing and described below. It is to be understood that the invention is not limited to the specific form thereof shown and described.

Of the accompanying drawing:

Figure 1 is an elevation of a platen press having a mold construction therein embodying the invention, and Figure 2 is a detail section through the roller supporting device embodied in the lower mold construction in accordance with the invention.

Referring to the drawing, the numeral 10 indicates the lower fixed platen of a press, 11 the upper movable platen of a press, 12 a lower mold section, and 13, an upper mold section.

The upper mold 13 may be secured to the upper platen 11 for movement therewith in the operation of the press.

The lower mold section 12 may be moved into the press onto the lower platen 10 in the position shown in Figure 1, and may be also moved out of the press upon a platform or shelf 14 when the press is open so as to facilitate the removal of molded articles therefrom and the filling of the mold with material to be molded. Suitable guides indicated at 15, may be provided between which the mold section 12 is moved into and out of the press, as will be understood.

The mold section 12 may have one or more roller supports indicated generally at 16, 16 in Figure 1, and in detail in Figure 2. To this end, the mold section 12 may be formed with one or more sockets 17 in the bottom thereof in which may be secured vertical guides such as spaced studs 18, 18 upon which the supports 16 may be slidably mounted, the supports 16 being yieldably urged downwardly by coil springs 19, 19 arranged about the studs 18 so as normally to hold the supports 16 against heads 18a, 18a of the studs 18. The sockets 17 are of such depth as to permit the supports 16 to be depressed upwardly therein against the yielding action of the coil springs 19. The supports 16 have journaled thereon rollers 20, preferably arranged in central apertures 16a in the supports 16, the rollers 20 being so positioned as normally to extend below the bottom surface of the mold section 12, as shown in Figure 2, but being depressible with their mounts or supports 16 against the yielding action of the springs 19 when the press shown in Figure 1 is closed under pressure. It will be apparent that by suitable arrangement of one or more of the roller supports 16, in the lower mold section 12, that its movement into and out of the press is greatly facilitated, and yet the roller supports do not interfere with the closing of the press, and are in no way injured by the closing of the press to permit the usual application of pressure to close the mold.

Modification of the invention may be resorted to without departing from the spirit thereof or the scope of the appended claims.

What is claimed is:

1. The combination with a platen press of a mold section movable into and out of the press, said mold section having in the bottom thereof one or more sockets, and one or more roller supports arranged in said sockets, yielding means for urging said roller supports downwardly to support the mold section in rolling engagement upon a surface but adapted to yield under pressure whereby said roller supports will be depressed upwardly into said sockets upon application of pressure of the press to said mold section, said sockets having studs therein with enlarged heads at the bottoms thereof, said supports including members slidable on said studs and said yielding means comprising coil springs about said studs and normally urging said supports downwardly against said enlarged heads, the supports each having a roller journaled thereon between said studs.

2. The combination with a platen press of a mold section movable into and out of the press, said mold section having in the bottom thereof one or more sockets, and one or more roller supports arranged in said sockets, yielding means for urging said roller supports downwardly to support the mold section in rolling engagement upon a surface but adapted to yield under pressure whereby said roller supports will be depressed upwardly into said sockets upon application of pressure of the press to said mold section, said sockets having therein downwardly extending guide means provided with enlarged heads, said supports being slidable on said guide means, and said yielding means comprising coiled springs about said guide means and normally urging said supports downwardly against said heads.

3. A mold section for a sectional mold, having in the bottom thereof one or more sockets, one or more roller supports arranged in said sockets, guide means for guiding said supports vertically in said sockets, yielding means for normally urging said roller supports downwardly in said sockets but permitting said roller supports to be depressed upwardly in said sockets, rollers mounted on said supports and extending below the same, and means for limiting the downward movement of said supports in said sockets under the yielding action of said yielding means so that said rollers normally will project out of said sockets below the bottom surface of said mold section to be engageable with a surface of a relatively fixed support upon which the mold section is placed to support the mold section thereon, said supports being depressible against the action of said yielding means whereby the bottom surface of said mold section may be pressed against said supporting surface, the rollers moving to positions above said supporting surface entirely inside said socket.

DIETRICH G. REMPEL.